Figure 1:
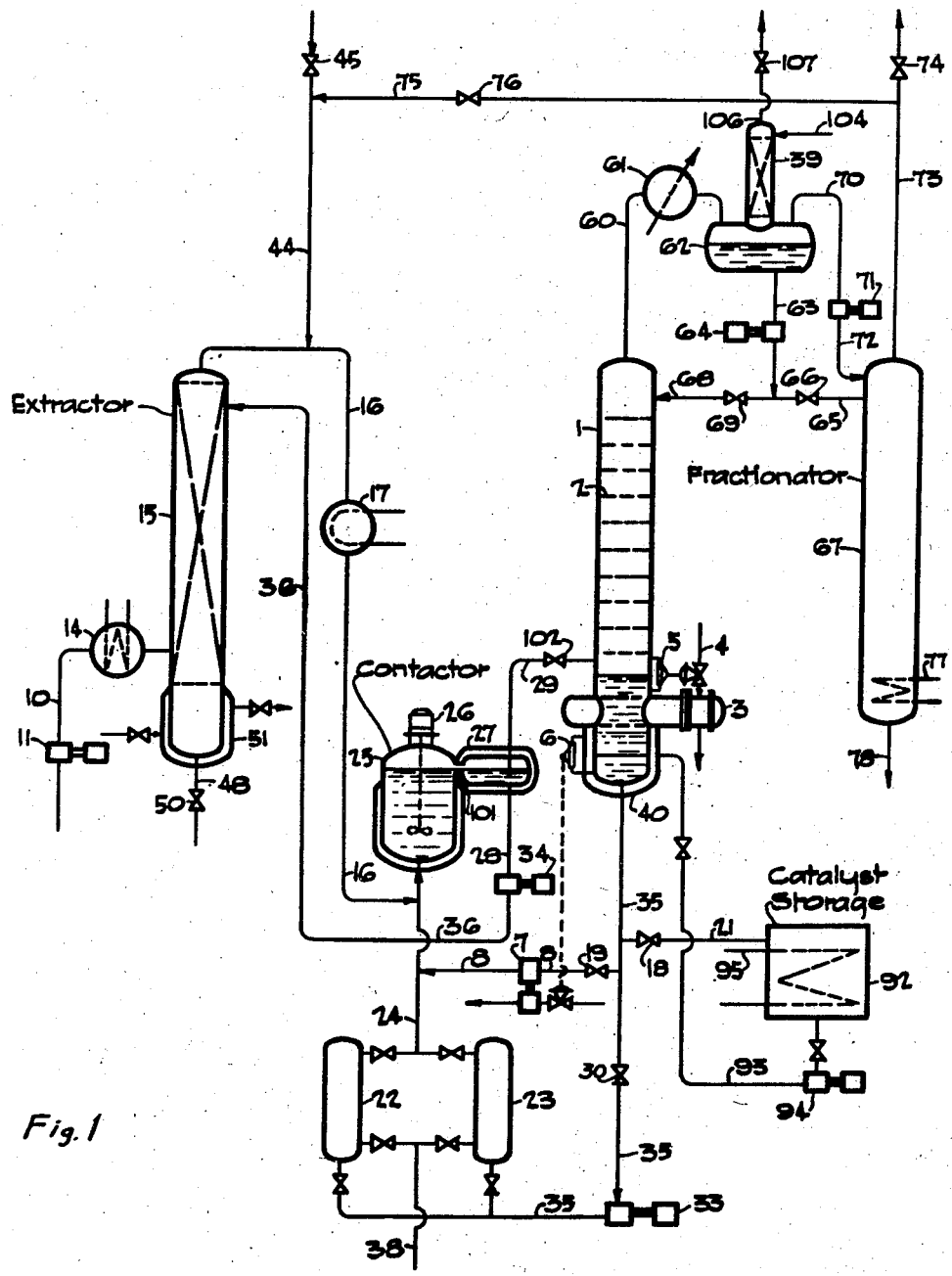

July 13, 1948.    M. SOUDERS, JR., ET AL    2,445,043
METHOD AND APPARATUS FOR DISTILLATION OF
MIXTURES FORMING TWO LIQUID PHASES
Filed Jan. 25, 1946    2 Sheets—Sheet 1

Inventors: Mott Souders, Jr.
Alexander J. Cherniavsky
by Oswald W. Milmore
their Attorney July 13, 1948.  M. SOUDERS, JR., ET AL  2,445,043
METHOD AND APPARATUS FOR DISTILLATION OF
MIXTURES FORMING TWO LIQUID PHASES
Filed Jan. 25, 1946  2 Sheets-Sheet 2
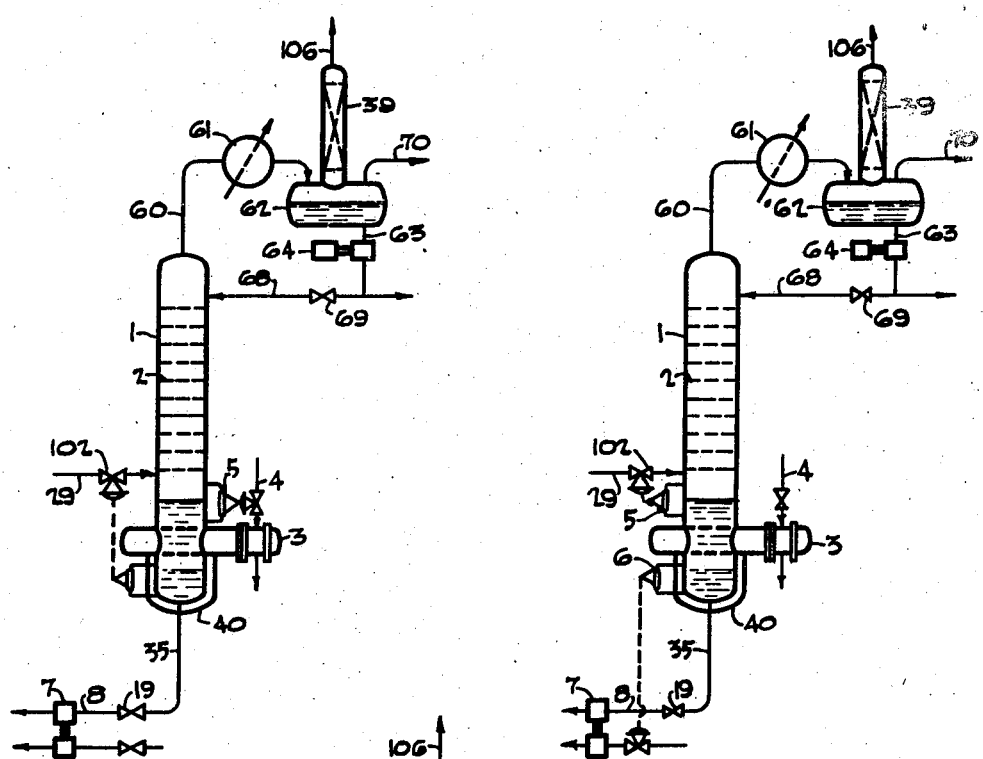
Fig. 2
Fig. 3
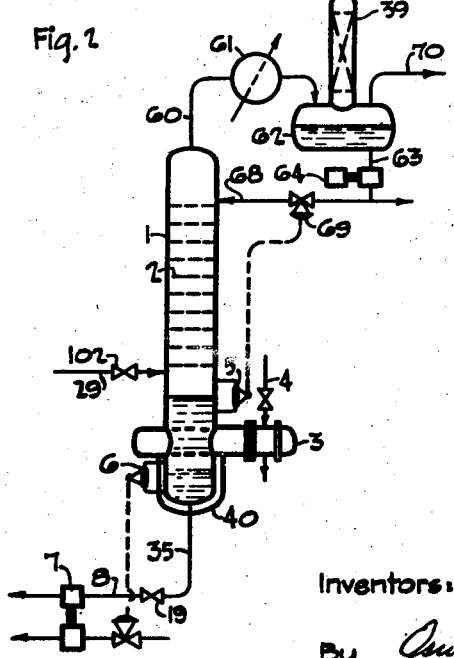
Fig. 4
Inventors: Mott Souders, Jr.
Alexander J. Cherniavsky
By _____,
their Attorney Patented July 13, 1948

2,445,043

UNITED STATES PATENT OFFICE 2,445,043

METHOD AND APPARATUS FOR DISTILLATION OF MIXTURES FORMING TWO LIQUID PHASES

Mott Souders, Jr., Piedmont, and Alexander J. Cherniavsky, San Francisco, Calif., assignors to Shell Development Company, San Francisco, Calif., a corporation of Delaware Application January 25, 1946, Serial No. 643,438

14 Claims. (Cl. 202—40)

The present invention relates to an improved method of effecting separation of fluid materials in multi-component mixtures thereof, and to improved apparatus for use therein. More specifically, the present invention relates to method and apparatus for effecting separations of constituents of multi-component fluid materials wherein at least one constituent is removed by vaporization and at least another constituent is withdrawn as a liquid without vaporization.

In the majority of processes involving catalytic conversions, the catalyst is employed in a solid state in the form of fragments, pellets, or the like. The use of solid catalysts is quite satisfactory in many cases, but has certain disadvantages such as the difficulty of moving solid catalysts in the reaction zone, poor heat transfer conditions, difficulty of properly contacting catalyst and reactants, the need for large volumes of catalysts, etc., which seriously detract from its suitability, particularly when employing metal halide catalysts. These disadvantages can often be diminished or eliminated by employing the catalyst in the liquid e. g., molten state.

It is often impractical, if not impossible, to employ the active catalyst per se in the molten state and a multi-component catalyst containing one or more modifying agents must therefore be used. Thus, for example, in the case of molten salt catalysts, a plurality of salts are generally combined. By the use of suitable combinations of salts, fusible mixtures which have excellent activity and may be melted to free-flowing liquids at relatively low temperatures may be prepared. Thus, for example, Friedel-Crafts type catalysts, such in particular as aluminum chloride, are only fusible in their pure state at relatively high temperatures, and at such temperatures they act primarily to cause degradation and sludge formation. On the other hand, if their salts are combined with other salts such as the halides of Li, Na, K, Cu, Mg, Zn, Cd, Sn, Pb, As, Sb, Bi, Cr, Mo, Fe, Co and Ni, excellent multi-component catalysts which may be used in the form of mobile liquids at temperatures even below 100° C. may be produced. In certain processes, such as isomerization and alkylation or hydrocarbons, a low melting point of the catalyst is important since the reaction equilibrium becomes progressively less favorable as the reaction temperature is increased, and it is therefore desirable to effect the conversion at relatively low temperatures.

The melting point of these multi-component catalysts is dependent upon their composition. In general, the composition is quite critical and if the catalyst is allowed to deviate from the desired composition the melting point is considerably increased. In the usual operation of processes with such catalysts by prior known methods, it is therefore necessary to operate at a temperature sufficiently above the solidification point of the catalyst to allow for any changes in melting point due to changes in catalyst composition during the process. Changes in the solidification points of the catalysts caused by variations of catalyst compositions are not only detrimental in requiring the use of somewhat higher reaction temperatures, but in their effect upon the degree of efficiency with which the catalysts and reactants may be contacted. In all such processes, the efficiency of contact of the reactants and the catalyst is of prime importance since it directly affects the conversion and production capacity. When such low-melting multi-component catalysts change appreciably in composition during use, the viscosity of the melt increases, and this usually causes a considerable falling-off of the conversion or production capacity.

These various molten catalysts, although highly desirable in many respects, present certain disadvantages when used in the hitherto proposed processes which have prevented their widespread use. One of these disadvantages has been the excessive cost and difficulty of recovering the catalyst after it is partly or completely spent. This is due to the fact that it is rarely practical to discard the spent catalyst and that the recovery of the valuable components therefrom usually requires withdrawing the molten mixture to a separate recovery unit wherein carbonaceous material is burned out or otherwise separated by mechanical or other means. In most cases it is necessary to follow this operation by a distillation of the catalyst components from the non-volatile material in the catalyst. Aluminum chloride-containing catalysts, for example, when spent will comprise non-volatile alumina formed by the degradation of aluminum chloride. This requires a separate treatment, usually under vacuum. In the hitherto proposed processes using catalysts of this type, these disadvantages have been greatly aggravated when treating hydrocarbons or other organic materials with catalysts of the Friedel-Crafts type due to the fact that these catalysts are particularly prone to form sludges. The sludges, which are presumably complex compounds comprising side reaction products and Friedel-Crafts halides, quickly become viscous and sticky. Since their accumulation in the reaction zone to any substantial extent causes mechanical difficulties such as pumping problems, line plugging, etc., it has been necessary to withdraw the catalyst from the system long before it is completely spent and subject it to the regeneration treatment.

One object of the invention is to provide apparatus in which reactions of the type described above may be carried out with a minimum of sludging and deterioration of the catalyst.

Another object of this invention is to provide an improved method for carrying out conversions of the type described above, particularly for effecting the separation of the conversion products from the molten catalyst.

Another object is to provide an improved method and apparatus for separating a mixture of substances forming two liquid phases wherein one of such materials is at least partially vaporized and separated as a vapor.

A further object of the present invention is to provide improved method and apparatus whereby vapor and liquid phase conversions with these fluid catalysts can be effected in a more practical and economical manner, while substantially obviating inherent difficulties encountered in the prior art apparatus.

The phase separator of this invention, and which is described in detail below, will be found to be suitable for use in any system wherein continuous separation of a treating agent and a treated material, one of the components being capable of volatilization, is required, as for example in numerous solvent extraction processes and the like. The separator is suitable for use also in processes of continuous separation of mixtures of substances which form together a single liquid phase, one of the substances being more volatile than the other one.

The separator or fractionator of this invention will find use also in fractionations of mixtures of organic substances, particularly hydrocarbons such as in petroleum fractions, having relatively narrow boiling ranges. By regulating the rate of withdrawal of liquid phase from the bottom of the fractionator to be a substantially constant proportion of the feed and varying the heat supplied for vaporization in response to variations in the liquid level in the fractionator, the separation of the constituents may be made substantially continuous and the purity of the withdrawn bottom liquid phase may be predetermined at almost any desirable value. Or, the rate of supply of heat for vaporization may be fixed at a constant value and the rate of withdrawal of liquid phase from the bottom of the fractionator may be varied in response to variations in the liquid level in the fractionator.

For the purpose of more clearly setting forth the invention, it will be described herein in its application to a specific hydrocarbon conversion, namely the isomerization of saturated hydrocarbons. The following detailed description of the invention is made with reference to the accompanying drawing which forms a part of this specification wherein:

Fig. 1 is a flow diagram showing an elevation of the separator 1 according to the invention, together with other apparatus used in conjunction therewith for converting hydrocarbons, certain parts being shown in section; and Figs. 2, 3 and 4 are elevational views of modified forms of the separator.

Referring to Fig. 1, a saturated hydrocarbon, for example dried butane, from any suitable source, is forced by means of pump 11 through conduit 10 and a preheater 14, to an intermediate part of an extraction zone. The extraction zone may consist of a column 15 provided with suitable packing material, baffles or the like. Within extraction zone 15, butane is contacted with catalyst as described more fully below. Butane, containing recovered catalyst components, is passed from extraction column 15 through conduit 16 and cooler 17 to a reaction zone.

Preferably, the reaction zone consists of a contactor chamber 25 which is provided with a mechanical agitator 26 and a settling chamber 27. A portion of the catalyst which is carried over and/or settles out in chamber 27 is passed to the top of extraction column 15 through conduit 28, pump 34 and conduit 36, any excess beyond that which may be contained in chamber 27 overflowing weir 101, and returning to the bottom of contactor chamber 25. Within chamber 25, butane is brought into intimate contact with a suitable fluid isomerization catalyst to effect the isomerization of the butane for example, a molten mixture of antimony chloride and aluminum chloride in the approximate proportions of 76 to 97 mol per cent $SbCl_3$ and 24 to 3 mol per cent $AlCl_3$. The temperature to be maintained within contactor chamber 25 may range from the minimum temperature at which the catalyst may be maintained in the fluid state up to about 200° C., for example, 60° C. to 120° C., and at a pressure to maintain the butane in the liquid phase up to any desired superatmospheric pressure, for example, from 125 to 500 p. s. i.

The isomerization, when employing catalysts of the above mentioned type, is preferably effected in the presence of a hydrogen halide, such as hydrogen chloride, introduced through conduit 44 provided with valve 45 and leading into line 16. The amount of hydrogen chloride introduced to the system may vary widely in accordance with the nature of the charge, the catalyst composition and the operating conditions. In such cases where it is not desired to recover and recycle the hydrogen chloride, minimum quantities such as from 0.3% to 5% of the hydrocarbon feed may be employed. When the hydrogen chloride is recycled, however, much larger quantities, for instance up to 25% of the butane charge, may be economically and advantageously employed. If desired, a limited amount of hydrogen or other suitable materials may be introduced with the hydrogen chloride to repress cracking or other undesirable side reactions.

By means of agitator 26, butane is intimately mixed with the fluid catalyst in the central part of contactor chamber 25, the reaction products tending to concentrate in the upper section of the contactor and spent catalyst in the lower section. From the upper section of contactor chamber 25 the reaction products, as well as entrained catalyst and catalyst dissolved in the reaction products (amounting to approximately 8% by weight of the hydrocarbons when using butane and $SbCl_3$-$AlCl_3$ catalyst mixtures), pass into settling chamber 27 from whence reaction products containing catalyst in solution, but very little entrained catalyst, pass through conduit 29 and into a separating zone.

The separating zone preferably comprises a tower 1 provided with fractionating elements such as plates or the like in the upper portion thereof at 2. The lower portion of tower 1 is provided with a heating element 3 in the form of steam coils or the like, which is spaced from the bottom of tower 1. A liquid level actuated element 6 is provided in the bottom of tower 1 below heating element 3 and a second liquid level actuated element 5 is provided in tower 1 above heating element 3. There are many level controlled means arranged or suitable for operation by an interface between two liquid levels, which means may be used as the liquid level actuated element 6, an example being the Foxboro liquid level controller model 30, manufactured and distributed by the Foxboro Company of Foxboro, Mass. Conduit 35 including a pump 33 leads to a catalyst regeneration zone, whence conduit 24 leads to contactor chamber 25. Conduit 8 including pump 7 leads from conduit 35 directly to conduit 24, bypassing pump 33 and the catalyst regeneration zone. Pump 7 is actuated by liquid level responsive element 6 and serves to maintain the level of the fluid catalyst in the bottom of tower 1 within the desired limits. Thus, when the liquid level of the catalyst in tower 1 increases beyond a desired maximum, liquid level responsive element 6 actuates pump 7 to increase the amount of catalyst withdrawn through conduit 8. Conversely, the amount of catalyst withdrawn through conduit 8 is decreased when the catalyst level in tower 1 falls below the desired minimum. Pump 33 is adapted to continuously pass approximately 10% by volume of the catalyst normally passing through conduit 8 to the catalyst regeneration zone. According to an alternative arrangement shown in Fig. 2, the level of the fluid catalyst in the bottom of the tower 1 may be maintained within the desired limits by utilizing the liquid level responsive element 6 to control the valve 102 in the inlet line 29 into the tower 1, and adjusting the rate of withdrawal of fluid catalyst from the tower to a substantially constant value. Either a surge tank or other towers may be utilized to take care of any variation in the rate of withdrawal of material from the contactor 25 and settling chamber 27.

Steam or other heat energy is supplied to heating element 3 through conduit 4, liquid level responsive element 5 being adapted to control the rate of heat input to heating element 3 in accordance with the liquid level of the hydrocarbon phase above the fluid catalyst phase. Thus, as the hydrocarbon liquid level increases above a pre-set maximum, element 5 acts to increase the heat input to heating element 3 and accordingly increase the rate of hydrocarbon vaporization. If the hydrocarbon liquid level falls below a pre-set minimum, element 5 acts to decrease the heat input to heating element 3 and thus decrease the rate of hydrocarbon vaporization and permit the hydrocarbon liquid level to increase. According to another alternative arrangement shown in Fig. 3, the heat energy may be supplied to the tower at a substantially constant rate and the liquid level maintained within the desired limits by employing the liquid level responsive element 5 to control the inlet valve 102. According to another alternative arrangement shown in Fig. 4, the heat is supplied at a constant rate and the liquid level responsive element 5 is connected to control the reflux return valve 69 in reflux return line 68. In the latter case the net result, insofar as heat energy is concerned, is to control the net heat energy added to the tower.

It is an essential element of this embodiment of the present invention that the heating element be disposed entirely within the upper liquid phase. In this manner deterioration and decomposition of the fluid catalyst as a result of prolonged heating is obviated and at the same time efficient and rapid vaporization of the hydrocarbon permitted. By operating in the manner described above, i. e. supplying all heat energy for hydrocarbon vaporization directly to the hydrocarbon phase and at the same time controlling the liquid levels of the two phases in such a manner as to automatically ensure their remaining within predetermined ranges, it has been found that sludging of the catalyst is reduced to a minimum even with maximum heat input for hydrocarbon vaporization. Sufficient heat is supplied to the catalyst phase by conduction and convection currents to maintain the same in a fluid state. Tower 1 is preferably jacketed at its lower end as at 49 to further ensure even heat distribution through the catalyst phase and reduce radiation heat losses.

Referring again to Fig. 1, spent or partially spent catalyst is withdrawn from settling chamber 27 and forced by means of a pump 34 through conduits 28 and 36 to the upper part of extraction column 15, wherein it is contacted with an upward flow of liquid hydrocarbon feed which was preheated. In the case of butane the preheating temperature may, for example, be 50° to 125° C., preferably below 100° C. The pressure is sufficient to ensure substantially liquid phase operation. During the downward flow of the spent or partially spent catalyst through extraction column 15, at least a substantial part of the more soluble components contained therein is dissolved in the hydrocarbon feed.

The sludge, comprising organic complexes of the Friedel-Crafts catalysts, which is contained in the spent catalyst is substantially insoluble in the hydrocarbon feed which contributed to its formation and accumulates in the lower part of column 15, whence it is withdrawn through line 48, controlled by valve 50, and eliminated from the system. The lower part of column 15 is provided with heating means such as, for example, a heating jacket 51 provided with inlet and outlet means for a heating medium such as steam or hot oil to maintain the spent catalyst residue in the fluid state. By careful control of conditions within column 15, substantially all of the $SbCl_3$ may be extracted from the spent catalyst by the incoming butane feed in a substantially pure state and conveyed in the butane stream through line 16 into the reaction zone. Only very little of the $AlCl_3$-hydrocarbon complex in the spent catalyst, which renders the use of molten salt catalysts so difficult in the processes used heretofore, remains within the system. This continuous removal of the $AlCl_3$-hydrocarbon complex from the system not only assures a substantial increase in catalyst life and maintenance of high catalyst activity, but greatly facilitates the handling of the molten catalyst within the system.

Since the catalytic activity and minimum temperature at which the $SbCl_3$-$AlCl_3$ catalyst can be maintained in the fluid state depend upon the catalyst composition, and since $SbCl_3$ is the predominating component of the catalyst, its continuous substantially complete recovery and return to the reaction zone greatly facilitate the maintenance of optimum reaction conditions. Antimony chloride, furthermore, is a relatively costly material and therefore the practical and efficient method for its recovery within the system greatly contributes to the lower cost at which isomerization may be effected by the present process when utilizing a catalyst melt comprising this compound. The recovered antimony chloride in the incoming hydrocarbon stream which passes through contactor 25, as well as additional quantities of catalyst from contactor 25 up to the saturation point of catalyst in the hydrocarbons, is carried into separator tower 1 wherein separation and recovery of the catalyst components immediately occur as a result of the vaporization of the hydrocarbons.

Sufficient catalyst flowing from tower 1 is either periodically or continuously bypassed through a drum as at 23 containing aluminum chloride, by means of valved line 35 and pump 33 to replace the aluminum chloride used up during the process in the formation of sludge.

The fluid catalyst may be drained from the drums 23 through line 38 and from the separator through valved lines 35 and 21 and passed to suitable catalyst storage means 92, an insulated vessel including a heating coil 95 therein being satisfactory for this purpose. From storage vessel 92 the catalyst, in heated condition, may be forced through line 93 to the bottom of tower 1 by means of pump 94, and thus returned to the system.

Reaction products comprising isobutane, normal butane and hydrogen chloride pass from tower 1 through line 60 and cooler 61 into accumulator 62. In passing through cooler 61 the reaction products are cooled to a temperature sufficiently low to effect the condensation of butanes. Although but a single cooler is shown in the drawing, more than one cooling system and, if desired, a refrigerator system may be used to effect the desired cooling of the reaction products. Liquid is drawn from accumulator 62 through line 63 and forced by means of pump 64 through line 65, provided with valve 66, to a stripping column 67. Although antimony chloride has but a slight vapor pressure at the reaction temperature, some will nevertheless tend to pass along with the reaction products leaving tower 1. In order to prevent the loss of this material and avoid the difficulties which result from its presence in the remainder of the system, sufficient liquid reflux is introduced into the upper part of tower 1 to carry any entrained antimony chloride back to the bottom of the tower 1. For this purpose, part of the liquid drawn from accumulator 62 is forced through line 68 provided with valve 69 as reflux, to the top of tower 1. Cooling means not shown in the drawing may be provided to further cool the reflux passing to the tower 1. Vapors and gases comprising hydrogen chloride are drawn from accumulator 62 through line 70 to compressor 71. From the high pressure side of compressor 71 the compressed stream is passed through line 72 into stripping column 67. Within stripping column 67 a gaseous fraction comprising hydrogen chloride is separated from a liquid fraction comprising isobutane and unreacted butane. A high pressure, for example in excess of about 300 p. s. i., is maintained within column 67 to effect the desired separation. The gaseous fraction comprising hydrogen chloride is eliminated from the top of column 67 through line 73 provided with valve 74, and is recycled at least in part through line 75 provided with valve 76, to line 44. Suitable means, such as, for example, a reboiler or heating coil 77 is provided in the bottom of column 67 to effect the desired separation. Liquid comprising isobutane and unreacted butane is withdrawn from the bottom of column 67 and discharged through line 78 provided with valve 79 for further fractionation.

As has been mentioned before, cracking and side reaction depressant materials, such as hydrogen, may be added to the system. These materials are preferably removed from the system by means of a packed section 39 mounted on accumulator 62. A heavy fraction derived from the fraction discharged through line 78 may be passed through conduit 104 to the top of packed section 39 and utilized as a scrubbing agent for such gaseous materials as may be vented from accumulator 62 through packed section 39, conduit 106 and valve 107 to suitable disposal means.

The process and apparatus of the invention are in no wise limited to the isomerization of hydrocarbons, but are applicable to a wide variety of processes wherein materials are treated in the vapor phase with fluid catalysts comprising normally solid materials or liquids which are higher-boiling than the material being treated. Thus, the apparatus of the invention is particularly applicable to the execution of such processes as alkylation, cracking, polymerization, reforming, desulfurizing, oxidation of hydrochloric acid, treating, etc., of hydrocarbons or other materials wherein such materials are contacted in the vapor or liquid phase with liquid catalysts or other treating agents. In the event that vapor phase treating is utilized, the various components should of course be delivered to the separating zone of the apparatus under conditions of pressure and temperature that will ensure their introduction in a liquid state.

As indicated hereinabove, the method and apparatus of this invention may be utilized in various processes. It will be understood that, instead of utilizing the tower 1 for separating volatile conversion products from a substantially non-volatile molten catalyst mass, the apparatus may be utilized in a method of effecting fractionation of a hydrocarbon mixture wherein heat energy for the fractionation is supplied by means of a heated molten heating medium which is inert to, denser than, and substantially non-miscible with, the hydrocarbon mixture, and which is circulated through at least a lower portion of the tower and an outside furnace. The hydrocarbon mixture or other suitable multi-component fluid material may be delivered to the tower as a liquid at some intermediate level and the heated molten heating medium may be delivered to the tower at a level above or below the hydrocarbon feed level, or at the same level. The material to be fractionated may be withdrawn from different levels of the tower, as is well known in the fractionation art, a portion thereof being taken off as vaporous overhead, and a portion may be withdrawn as liquid bottoms. However, in this case, the liquid bottoms collects in the lower part of the tower on top of the molten heating medium collected therein. The molten heating medium is withdrawn from the bottom of the tower, reheated and recycled to the tower. The rate of withdrawal and/or rate of adding the molten heating medium may be varied in different ways and made responsive to changes in the interface level between the molten heating medium and the liquid material thereon and/or the liquid level in the lower part of the tower. Thus, the interface level may be used to control the withdrawal rate of heating medium, the withdrawal of liquid phase material from the material being fractionated may be fixed at a definite proportion of the feed rate, and the rate of adding heated molten heating medium may be made responsive to changes in the level of the liquid phase in the tower. In view of the foregoing description, one skilled in the art will be able to select the most suitable arrangement of correlated rates and rate-control means for the desired continuous operation with the maximum of efficiency in energy utilization, separation, and/or purity of separated fractions, depending upon the particular composition of the material to be separated, fractionated, or otherwise treated in accordance with this invention.

The apparatus described as tower 1 in the drawing and foregoing description in the specification may be utilized also in a method of fractionating a homogeneous multi-component fluid material wherein the heat is supplied indirectly by means of heating means 3. The multi-component material, such as a mixture of hydrocarbons, may be fed into the tower of a stream of material of substantially constant composition, liquid phase being withdrawn from the lower part of the tower at a rate in a fixed ratio to the rate of the feed, and the rate of supplying heat for vaporization varied in response to changes in the liquid level in the tower. In this use of the tower there is no interface between two liquid phases and only the liquid-vapor interface is available for actuating a control. The feed valve and the liquid withdrawal valve may be set at predetermined values and so as to give a predetermined ratio of rate of liquid withdrawal to rate of feed, which ratio will be determined by the degree of purity desired in either the withdrawn liquid or the overhead vapor and the efficiency of the fractionating column. However, they may be interconnected so as to maintain a particular predetermined ratio although the rate of each may be varied as desired or found to be expedient.

Thus, in accordance with the present invention, there has been described an improved method and apparatus for substantially continuously separating a multi-component fluid material which may comprise miscible as well as non-miscible components wherein varying liquid levels inside a separating or fractionating column, and which may be made indicative of the degree of separation, are utilized to vary the means used to effect the separation (such as heat energy for vaporization).

This application is a continuation-in-part of our copending application Serial No. 467,272, filed November 27, 1942 (now abandoned).

We claim as our invention:

1. An apparatus for separating two liquid phases comprising: a vessel, an intermediate heating means spaced from the bottom of said vessel so as to give a substantial space within said vessel below said heating means, vapor outlet means above said heating means, liquid outlet means in said bottom space, level controlled means above said heating means arranged to regulate the admission of the heating medium to said heating means, and level controlled means located below said heating means arranged for operation by an interface between two liquids and to control a valve in said outlet means in said bottom space.

2. An apparatus for separating two liquid phases comprising: a vessel, an intermediate heating means spaced from the bottom of said vessel so as to give a substantial space within said vessel below said heating means, vapor fractionating means above said heating means, vapor outlet means leading from the upper part thereof, liquid outlet means in said bottom space, level controlled means above said heating means arranged to regulate the admission of the heating medium to said heating means, and level controlled means located below said heating means arranged for operation by interface between two liquids and to control a valve in said outlet means in said bottom space.

3. An apparatus for separating two liquid phases comprising: a vessel, an intermediate heating means spaced from the bottom of said vessel so as to give a substantial space within said vessel below said heating means and from the top of said vessel so as to give a substantial space in said vessel above said heating means, vapor outlet means in said upper space, liquid outlet means in said bottom space, level controlled means above said heating means arranged to regulate the admission of the heating medium to said heating means, and level controlled means located below said heating means arranged for operation by an interface between two liquids and to control a valve in said outlet means in said bottom space.

4. An apparatus for separating two liquid phases comprising: a vessel, an intermdiate heating means spaced from the bottom of said vessel so as to give a substantial space within said vessel below said heating means, vapor outlet means above said heating means, liquid outlet means in said bottom space, feed inlet means in said vessel spaced intermediate said vapor and said liquid outlet means, level controlled means above said heating means arranged to regulate the admission of the heating medium to said heating means, and level controlled means located below said heating means arranged for operation by an interface between two liquids and to control a valve in said inlet means in said vessel.

5. An apparatus for separating two liquid phases comprising: a vessel, an intermediate heating means spaced from the bottom of said vessel so as to give a substantial space within said vessel below said heating means, vapor outlet means above said heating means, liquid outlet means in said bottom space, feed inlet means in said vessel spaced intermediate said vapor and said liquid outlet means, level controlled means located below said heating means arranged for operation by an interface between two liquids and to control a valve in said outlet means in said bottom space, and level controlled means above said heating means arranged to control a valve in said inlet means in said vessel.

6. A method of separating a multi-component fluid material capable of forming two liquid phases having different densities, which comprises substantially continuously introducing said material into a fractionating column and forming therein two liquid phases, withdrawing the components forming the liquid phase having the higher density from the bottom of said column and controlling said withdrawal by increasing the rate thereof in response to increases in the interface level between the two liquid phases in the column and decreasing the rate thereof in response to decreases in said interface level, removing the components forming the liquid phase having the lower density as vaporous overhead from said column, and supplying indirect heat to the liquid material in the column at a rate varying in response to changes in the upper liquid level of said lighter liquid phase, said rate being increased with increasing liquid level and decreased with decreasing liquid level.

7. A method of separating a multi-component fluid material capable of forming two liquid phases having different densities, which comprises substantially continuously introducing said material into a fractionating column and forming therein two liquid phases, withdrawing the components forming the liquid phase having the higher density from the bottom of said column at a substantially uniform rate, controlling the rate of introducing said fluid material into the column in response to changes in the interface level between the two liquid phases in the column, said rate being increased with decreasing interface level and decreased with increasing interface level, removing the components forming the liquid phase having the lower density as vaporous overhead from said fractionating column, and supplying indirect heat to the liquid material in the column at a rate varying in response to changes in the upper liquid level of said lighter liquid phase, said rate being increased with increasing liquid level and decreased with decreasing liquid level.

8. A method of fractionating a multi-component fluid material which comprises, substantially continuously introducing said material as a stream of material of substantially uniform composition into a fractionating column, withdrawing liquid from the bottom of said column at a substantially uniform rate, removing vaporous material overhead from said column, and supplying heat to the bottom of said column at a rate varying in response to changes in the liquid level in the bottom of said column, said rate being increased with increasing liquid level and decreased with decreasing liquid level.

9. A method of fractionating a multi-component fluid material which comprises, substantially continuously introducing said material into a fractionating column, withdrawing at least one of said fluid components as liquid from the bottom of said fractionating column, removing at least one of said fluid components as vaporous overhead from said fractionating column, and supplying heat to the bottom of said column at a rate varying in response to changes in the liquid level in the bottom of said column, said rate being increased with increasing liquid level and decreased with decreasing liquid level.

10. A method of fractionating a multi-component fluid material which comprises substantially continuously introducing said material into a fractionating column, substantially continuously withdrawing liquid from the bottom of said column, substantially continuously removing vaporous material overhead from said column, and supplying heat to the bottom of said column at a rate varying in response to changes in the liquid level in the bottom of said column, said rate being increased with increasing liquid level and decreased with decreasing level.

11. An apparatus for separating two liquid phases comprising: a vessel, an intermediate heating means spaced from the bottom of said vessel so as to give a substantial space within said vessel below said heating means, said heating means including a valve for controlling the admission of heat thereto, vapor outlet means above said heating means, liquid outlet means including a valve in said bottom space, feed inlet means including a valve in said vessel spaced intermediate to said vapor and said liquid outlet means, level controlled means above said heating means and level controlled means located below said heating means arranged for operation by an interface between two liquids, each of said level controlled means being connected to operate one of said valves.

12. An apparatus for separating two liquid phases comprising: a vessel, an intermediate heating means spaced from the bottom of said vessel so as to give a substantial space within said vessel below said heating means, said heating means including a valve controlling the admission of heat thereto, vapor outlet means above said heating means, a liquid reflux line including a valve above said heating means, level controlled means above said heating means arranged to regulate one of said valves, liquid outlet means including a flow controller in said bottom space, feed inlet means including a flow controller in said vessel spaced intermediate to said vapor and said liquid outlet means, and level controlled means located below said heating means arranged for operation by an interface between two liquids arranged to operate one of said flow controllers.

13. A method of separating a multi-component fluid material capable of forming two liquid phases having different densities, which comprises substantially continuously introducing said material into a fractionating column at a feed rate and forming within said column two liquid phases, withdrawing the components of the liquid phase having the higher density from the bottom of said column at a bottom drawoff rate, removing at least a portion of the components forming the liquid phase having the lower density as vaporous overhead from said fractionating column, supplying heat to the liquid material in the column at a heating rate, controlling one of said rates in response to changes in the interface level between the two liquid phases in the column, the rate being increased or decreased to maintain said interface level constant, controlling another of said rates in response to the upper liquid level of said lighter liquid phase, said other rate being increased or decreased to maintain said liquid level constant, and maintaining the remaining of said rates substantially uniform.

14. A method of separating a multi-component fluid material capable of forming two liquid phases having different densities, which comprises substantially continuously introducing said material into a fractionating column at a feed rate and forming within said column two feed phases, withdrawing the components of the liquid phase having the higher density from the bottom of said column at a bottom drawoff rate, controlling one of said rates in response to changes in the interface level between the two liquid phases in the column, the rate being increased or decreased to maintain said interface level constant, removing at least a portion of the components forming the liquid phase having a lower density as vaporous overhead from said fractionating column, returning liquid reflux to the column to decrease the overall heat energy added to the column, supplying heat to the liquid material in the column to increase the overall heat energy added to the column in response to changes in the upper liquid level of said lighter liquid phase.

MOTT SOUDERS, Jr.
ALEXANDER J. CHERNIAVSKY.

REFERENCES CITED

The following references are of record in the file of this patent:

UNITED STATES PATENTS

| Number | Name | Date |
|---|---|---|
| 1,113,521 | Waterhoux | Oct. 13, 1914 |
| 1,890,152 | Hills | Dec. 6, 1932 |
| 1,948,595 | Pyzel | Feb. 27, 1934 |
| 2,086,808 | Kallam | July 13, 1937 |
| 2,134,882 | Monro | Nov. 1, 1938 |
| 2,277,070 | Carney | Mar. 24, 1942 |
| 2,388,931 | Nelson | Nov. 13, 1945 |